United States Patent [19]

Isomura et al.

[11] Patent Number: 5,741,474
[45] Date of Patent: Apr. 21, 1998

[54] PROCESS FOR PRODUCTION OF HIGH-PURITY HYDROGEN

[75] Inventors: Manabu Isomura, Tsushima; Takao Soma, Nishikamo-gun; Tomonori Takahashi, Chita, all of Japan

[73] Assignee: NGK Insulators, Ltd., Japan

[21] Appl. No.: 443,551

[22] Filed: May 18, 1995

[30] Foreign Application Priority Data

May 23, 1994 [JP] Japan .................... 6-108625

[51] Int. Cl.$^6$ ............... C01B 3/02; C01B 3/24; C01B 3/26
[52] U.S. Cl. ............. 423/648.1; 48/127.7; 48/127.9; 422/198; 422/211; 423/650; 423/652
[58] Field of Search ................. 48/127.9, 202, 48/127.7, 214 A, 73; 422/198, 211, 219; 423/650, 652, 648.1

[56] References Cited

U.S. PATENT DOCUMENTS

| | | | |
|---|---|---|---|
| 2,135,694 | 11/1938 | Bardwell et al. | 423/652 |
| 4,391,794 | 7/1983 | Silberring | 423/650 |
| 4,810,485 | 3/1989 | Marianowski et al. | 423/652 |
| 5,229,102 | 7/1993 | Minet et al. | 423/652 |
| 5,326,550 | 7/1994 | Adris et al. | 423/652 |

FOREIGN PATENT DOCUMENTS 63-295402  12/1988  Japan .
5-147902   6/1993   Japan .

*Primary Examiner*—Wayne Langel
*Attorney, Agent, or Firm*—Parkhurst & Wendel, L.L.P.

[57] ABSTRACT

There is a system for producing high-purity hydrogen by reforming a hydrocarbon and/or an oxygen atom-containing hydrocarbon to form a reformed gas containing hydrogen and separating the hydrogen from said gas. The system includes a hydrocarbon source, a water source, an oxygen source, a vaporization chamber connecting with the hydrocarbon source, the water source and the oxygen source, and a reforming chamber provided with a catalyst for steam reforming and partial oxidation and a hydrogen-separating membrane. The reforming chamber is thermally connected with the vaporization chamber. A process for producing high-purity hydrogen includes heating a reforming chamber provided with a hydrogen-separating membrane, feeding, into the reforming chamber, hydrocarbon, steam and oxygen or air to give rise to steam reforming and partial oxidation therein to produce a reaction gas, and passing the reaction gas through the hydrogen-separating membrane to recover high-purity hydrogen. The heat possessed by the portion of the reaction gas not permeable into the hydrogen-separating membrane and the heat generated by the partial oxidation are utilized for the heating and reforming of the hydrocarbon, water and oxygen or air.

5 Claims, 1 Drawing Sheet

PROCESS FOR PRODUCTION OF HIGH-PURITY HYDROGEN

BACKGROUND OF THE INVENTION

1. Field of the Invention

The present invention relates to a system for production of high-purity hydrogen, a process for production of high-purity hydrogen, and a fuel cell system. More particularly, the present invention relates to a system for efficient production of high-purity hydrogen, a process for efficient production of high-purity hydrogen, and a fuel cell system provided with said system.

2. Description of the Prior Art

A process for hydrogen production is known which utilizes the steam reforming of a hydrocarbon and/or an oxygen atom-containing hydrocarbon, for example, methane, propane, methanol, ethanol or petroleum. The steam reforming is represented by the following formula in the case of, for example, reforming of methanol.

$$CH_3OH + H_2O \rightarrow CO_2 + 3H_2 \quad (1)$$

Japanese Patent Application Kokai (Laid-Open) No. 295402/1987 discloses a process for producing hydrogen by conducting the reforming of formula (1) and recovering the formed hydrogen by the use of a hydrogen-separating membrane.

Since the reforming of formula (1) is an endothermic reaction, heat must be supplied from outside in order to allow the reaction to proceed or continue. In Japanese Patent Application Kokai (Laid-Open) No. 147902/1993, this heat is supplied by burning the portion of the reformed gas not permeable into the hydrogen-separating membrane (said portion still contains hydrogen and is hereinafter referred to as non-permeable gas).

A fuel cell is known as a means for utilizing the energy generated by the reaction of hydrogen and oxygen, as electric energy. For the efficient operation of a fuel cell, use of high-purity hydrogen is necessary. In the case of a solid polymer type fuel cell, in particular, it is necessary to reduce the CO concentration in reformed gas to several ppm or less in order to prevent platinum (an electrode catalyst) from being poisoned by CO. Hence, it has been studied to combine an apparatus allowing for hydrogen production such as mentioned above, with a fuel cell to use the combination as a portable power source or in an electric automobile.

Studies made by the present inventors indicated that the invention as described in Japanese Patent Application Kokai (Laid-Open) No. 147902/1993 has the following problems.

As shown in the formula (1), 3 moles of hydrogen are obtained from 1 mole of methanol. If the hydrogen recovery by the hydrogen-separating membrane, i.e. the proportion of the hydrogen passing through the membrane to the total hydrogen formed is 100%, the non-permeable gas is zero, and there is supplied no heat necessary for proceeding and continuing with methanol reforming. Hence, the hydrogen recovery must be reduced to 70–80% to secure the heat required for the reforming. With this reduction in hydrogen recovery, the amount of hydrogen formed from 1 mole of methanol decreases to about 2 moles, reducing the efficiency of hydrogen production.

Further, in the heat supply by combustion of non-permeable gas (containing hydrogen), which is external heating, the efficiency of heat conduction is low.

Furthermore, in the process disclosed in Japanese Patent Application Kokai (Laid-Open) No. 147902/1993, which burns part of the hydrogen formed by reforming, to use the generated energy as a heat source for reforming, the efficiency of hydrogen production is not satisfactory. Accordingly, in applying the process to an electric automobile provided with a hydrogen-producing apparatus and a fuel cell, the fuel utilization is low.

OBJECT AND SUMMARY OF THE INVENTION

In view of the above situation, objects of the present invention are to provide a system for production of high-purity hydrogen, superior in efficiencies of hydrogen production and heat conduction and low in cost of hydrogen production; and a process for production of high-purity hydrogen using said system.

Another object of the present invention is to provide a fuel cell system utilizing the above system for production of high-purity hydrogen.

In order to achieve the above objects, the present inventors made a study and determined that the above objects can be achieved by utilizing the partial oxidation (an exothermic reaction) of a hydrocarbon and/or an oxygen atom-containing hydrocarbon (e.g. methanol), represented by the following typical formula:

$$CH_3OH + (\frac{1}{2})O_2 \rightarrow CO_2 + 2H_2 \quad (2)$$

The finding has led to the completion of the present invention.

According to the present invention there is provided a system for producing high-purity hydrogen by reforming a hydrocarbon and/or an oxygen atom-containing hydrocarbon to form a reformed gas containing hydrogen and separating the hydrogen from said gas, which system includes a hydrocarbon source, a water source, an oxygen source, a vaporization chamber connecting with the hydrocarbon source, the water source and the oxygen source, and a reforming chamber provided with a catalyst for steam reforming and partial oxidation and a hydrogen-separating membrane, the reforming chamber being thermally connected with the vaporization chamber.

The present invention further provides a process for producing high-purity hydrogen by reforming a hydrocarbon and/or an oxygen atom-containing hydrocarbon to form a reformed gas containing hydrogen and passing the reformed gas through a hydrogen-separating membrane to selectively recover hydrogen from the reformed gas, which process comprises heating a reforming chamber provided with a hydrogen-separating membrane, and feeding, into the reforming chamber, hydrocarbon, steam and oxygen or air to give rise to steam reforming and partial oxidation therein.

The present invention furthermore provides a process for producing high-purity hydrogen by reforming a hydrocarbon and/or an oxygen atom-containing hydrocarbon to form a reformed gas containing hydrogen and passing the reformed gas through a hydrogen-separating membrane to selectively recover hydrogen form the reformed gas, which process comprises heating a reforming chamber provided with a hydrogen-separating membrane, and feeding, into the reforming chamber, hydrocarbon, steam and oxygen or air to give rise to steam reforming and partial oxidation therein to produce a reaction gas, and passing the reaction gas through the hydrogen-separating membrane to recover high-purity hydrogen, wherein the heat possessed by the portion of the reaction gas not permeable into the hydrogen-separating membrane and the heat generated by the partial oxidation are utilized for the heating and reforming of the hydrocarbon, water and oxygen or air.

DETAILED DESCRIPTION OF THE INVENTION

Figure 1:
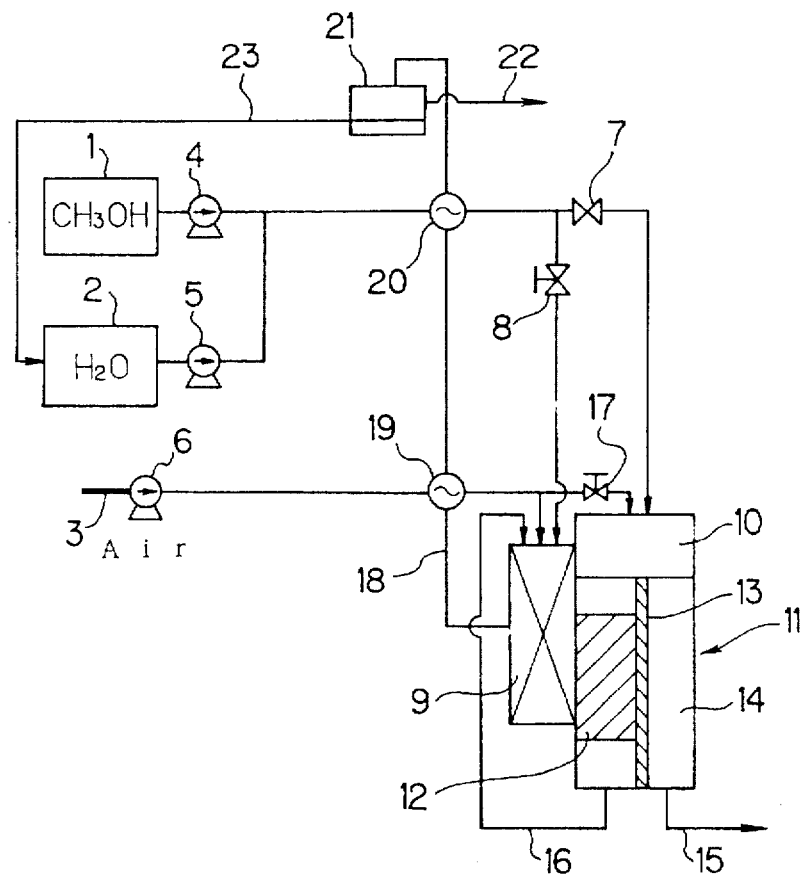
FIG. 1 is a drawing showing an example of the system for production of high-purity hydrogen according to the present invention.

In the present invention, the heat generated by the partial oxidation (which is an exothermic reaction) represented by the above formula (2) is utilized to give rise to and continue the reforming of a hydrocarbon and/or an oxygen atom-containing hydrocarbon, for example, methanol. As a result, the hydrogen remaining in the non-permeable gas (said hydrogen has hitherto been burnt and used as a heat source to give rise to or continue the reforming) can be made zero and the recovery of the hydrogen present in the reformed gas can be improved.

Further, the heat generated by the partial oxidation may be used as heat to give rise to and continue the reforming, together with the heat generated by the combustion of the non-permeable gas. In this case also, the hydrogen remaining in the non-permeable gas can be reduced.

Furthermore, the partial oxidation and the reforming are conducted in one same chamber or reactor, making smooth the heat conduction from the partial oxidation to the reforming and making small the heat loss associated with said conduction.

In the fuel cell system of the present invention provided with a fuel cell and the above-mentioned system of the present invention for production of high-purity hydrogen, high-purity hydrogen is produced at a high efficiency and supplied to the fuel cell, whereby the efficient operation of fuel cell is made possible.

Since the present fuel cell system is further provided with a storage battery, the electric energy generated by the fuel cell can be stored in the storage battery. The electric energy stored in the storage battery can be used to start the present fuel cell system. Therefore, the present fuel cell system requires no external electric source at the start and can be used by itself as a portable electric source at construction sites or at home. Moreover, in the present fuel cell system, the efficiency of hydrogen production is high, making high the fuel utilization.

In portable electric sources, small size and light weight are required. As a fuel cell satisfying such requirements, fuel cells of phosphate type or solid polymer type are known. These fuel cells have had a problem that the platinum used as an electrode catalyst is poisoned by the CO present in the hydrogen (fuel) supplied to the fuel cell. In the case of a solid polymer type fuel cell, the platinum is poisoned by CO of only about 10 ppm.

In the fuel cell system of the present invention, even when a solid polymer type fuel cell is used, the poisoning of electrode catalyst can be avoided because the system is provided with a hydrogen-separating membrane (into which only hydrogen is permeable selectively) and thereby high-purity hydrogen is supplied to the fuel cell of the system.

As described above, the fuel cell system of the present invention can preferably be used as a portable electric source. By combining the present system with a driving means such as motor or the like, to supply a power to the driving means, an electric automobile using the present fuel cell system can be produced.

In applying the present fuel cell system to an electric automobile, the fuel cell is preferably a solid polymer type fuel cell which is operable at low temperatures and which is small and lightweight; the hydrocarbon and/or the oxygen atom-containing hydrocarbon as a material to be reformed is preferably methanol or ethanol, each of which is a liquid at normal temperature and normal pressure and is convenient to store and transport; the hydrogen-separating membrane may be, for example, a Pd membrane or a Pd-Ag alloy membrane; and the catalyst used for reforming and partial oxidation may be, for example, a Cu-based catalyst or a nobel metal catalyst.

The present invention is hereinafter described specifically by way of Embodiments with reference to the drawings. However, the present invention is not restricted to these Embodiments.

EMBODIMENT 1

FIG. 1 is a drawing showing an embodiment of the system for production of high-purity hydrogen according to the present invention. In FIG. 1, the system for hydrogen production comprises a methanol source (as a hydrocarbon source) 1, a $H_2O$ source 2, an oxygen source 3, a heater 9, a vaporization chamber 10 and a reforming chamber 11. Incidentally, the hydrocarbon and/or the oxygen atom-containing hydrocarbon is not restricted to methanol and may be methane, ethane, ethanol, propane, petroleum or the like.

The reforming chamber 11 comprises a hydrogen-separating membrane 13, a catalyst 12 and a separated-gas chamber 14 with the catalyst 12 and the separated-gas chamber 14 being divided by the hydrogen-separating membrane 13. In the present Embodiment, the heater 9, the vaporization chamber 10 and the reforming chamber 11 are provided adjacently to each other, whereby they are connected thermally. The methanol source 1, the $H_2O$ source 2 and the oxygen source 3 are each connected to the heater 9 and the vaporization chamber 10.

The mode of thermal connection between the heater 9, the vaporization chamber 10 and the reforming chamber 11 is not restricted to the above mode. Any mode is usable as long as the heat of the heater 9 can appropriately be conducted to the vaporization chamber 10 and the reforming chamber 11, and it is possible to employ a mode in which the heater 9 is adjacent to or abuts against the vaporization chamber 10 and the reforming chamber 11, or a mode in which the heater 9 surrounds the vaporization chamber 10 and the reforming chamber 11. Alternatively, the heater 9, the vaporization chamber 10 and the reforming chamber 11 can be connected thermally by circulating a heat medium through them.

Next, description is made of an embodiment of the production of high-purity hydrogen using the hydrogen production system of the present Embodiment. First, a valve 8 is opened, and a pump 4 and a pump 6 are started to feed methanol and air from the methanol source 1 and the oxygen source 3 to the heater 9. Methanol and air are burnt in the heater 9 to heat the vaporization chamber 10 and the reforming chamber 11 (both provided adjacently to the heater 9) to their desired temperatures, whereby the system of the present Embodiment is put in an operable state.

In the present Embodiment, the system is put in an operable state as above. The system may be put in an operable state by any other method capable of heating the vaporization chamber 10 and the reforming chamber 11 to their desired temperatures, for example, by adding, to the system, other heating means capable of heating the vaporization chamber 10 and the reforming chamber 11 to their desired temperatures.

Then, the valve 8 is closed; a valve 7 and a valve 17 are opened and a pump 5 also is started to feed $H_2O$, in addition to methanol and air, into the vaporization chamber 10; in the vaporization chamber 10, methanol and $H_2O$ are vaporized and heated to a desired temperature and, simultaneously therewith, air also is heated to the temperature.

Thereafter, the methanol, $H_2O$ and air all heated enter the reforming chamber 11 and undergo the above-mentioned reforming and partial oxidation in the presence of the catalyst 12. The catalyst 12 may be any catalyst as long as it is capable of catalyzing the reforming and the partial oxidation, and may be a single-component catalyst or a mixed-component catalyst. The hydrogen generated by the above two reactions enters the separated-gas chamber 14 continuously through the hydrogen-separating membrane 13 and is recovered as high-purity hydrogen via a path 15. Meanwhile, the non-permeable gas (which is not permeable into the hydrogen-separating membrane 13) is fed into the heater 9 via a path 16 and burnt therein. The heat generated by the burning is utilized as a heat required for the vaporization and heating of methanol, $H_2O$ and air conducted in the vaporization chamber 10 and also as a heat required for the reforming conducted in the reforming chamber 11.

The surplus portion of the combustion gas generated in the heater 9 is passed through heat exchangers 19 and 20 via a path 18, and the heats recovered by the heat exchangers 19 and 20 are utilized for the preheating of methanol, $H_2O$ and air. The gas of desired temperature leaving the heat exchangers 19 and 20 is sent to a water separator 21 for water recovery and discharged via a discharge gas path 22. The water recovered in the water separator 21 is sent to the $H_2O$ source 2 via a path 23 and used for hydrogen production.

In the present Embodiment, the non-permeable gas not permeable into the hydrogen-separating membrane 13 contains hydrogen. Meanwhile, when the non-permeable gas contains no hydrogen, that is, system operation is conducted at a hydrogen recovery of nearly 100%, the heat necessary for vaporization and reforming is supplied only by the heat generated by partial oxidation, making unnecessary the heater 9. In this case, 50–70% of the methanol fed is used for partial oxidation. When more than 70% of the methanol fed is used for partial oxidation, the heat generated by partial oxidation becomes more than necessary (i.e. surplus), reducing the efficiency of hydrogen production. When less than 50% of the methanol fed is used for partial oxidation, the heat generated by partial oxidation does not satisfy the energy required for vaporization and reforming.

The function of the present Embodiment is described below. In the present Embodiment, since the reforming and the partial oxidation take place simultaneously in the reforming chamber 11, the thermal conduction from the partial oxidation to the reforming is efficient as compared with the thermal conduction by external heating.

In the present Embodiment, as the heat source for vaporization and reforming, there is used the heat generated by partial oxidation and the heat generated by the burning of non-permeable gas; therefore, the amount of high-purity hydrogen produced per unit amount of methanol is larger when the proportion of the heat generated by partial oxidation is larger. Hence, it is preferable to operate the hydrogen production system by making as large as possible the proportion of the heat generated by partial oxidation to make the hydrogen recovery as high as possible. Theoretically speaking, the highest efficiency of hydrogen production can be achieved by controlling the hydrogen recovery at 100% and supplying the heat necessary for vaporization and reforming only by partial oxidation.

EMBODIMENT 2

Figure 2:
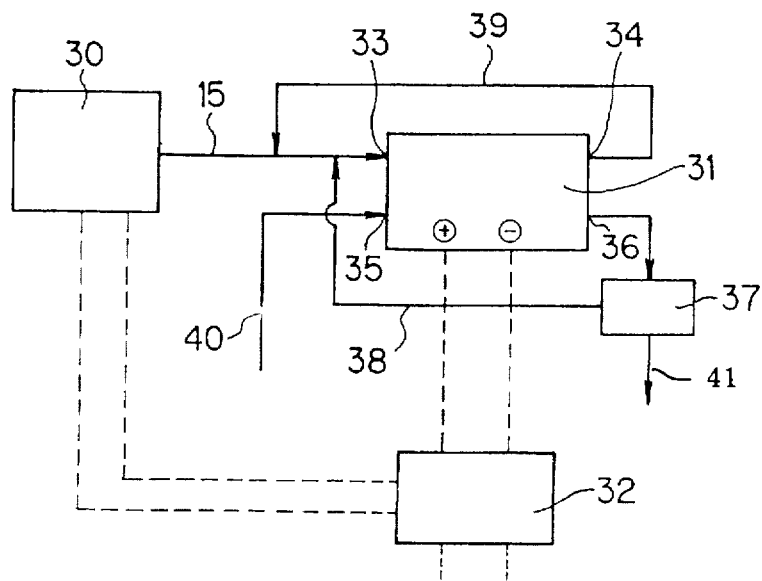
FIG. 2 is a drawing showing an example of the fuel cell system of the present invention.

FIG. 2 shows an embodiment of the fuel cell system of the present invention. This fuel cell system comprises a hydrogen production system 30 as shown in FIG. 1, a solid polymer type fuel cell 31 (as a typical fuel cell) and a storage battery 32. The fuel cell 31 comprises a hydrogen pole inlet 33, a hydrogen pole outlet 34, an air pole inlet 35 and an air pole outlet 36, and the air pole outlet 36 is connected with a water separator 37.

The high-purity hydrogen fed from the hydrogen production system 30 is humidified in the middle of a path 15 by the $H_2O$ sent via the air pole outlet 36 of the fuel cell 31, the water separator 37 and a path 38, and is fed into the hydrogen pole inlet 33. The gas discharged from the hydrogen pole outlet 34 of the fuel cell 31 is sent to the path 15 via a path 39 and circulated into the hydrogen pole inlet. Meanwhile, into the air pole inlet 35 is fed air via a path 40, and the gas discharged from the air pole outlet 36 is sent to the water separator 37 to remove the water present in the gas. The water recovered in the water separator 37 is sent to the path 15 as mentioned previously and used to humidify the high-purity hydrogen sent from the hydrogen production system 30. The water-removed gas is discharged from the water separator 37 via a path 41. The electric power generated by the fuel cell 31 is sent to the storage battery 22 and stored therein.

The electric power stored in the storage battery 32 is taken out as necessary and can be used, for example, as an energy required to start the hydrogen production system 30.

As described above, according to the present invention, there can be provided, by utilizing the partial oxidation of a hydrocarbon and/or an oxygen atom-containing hydrocarbon, (1) a system for production of high-purity hydrogen, superior in hydrogen production efficiency and heat conduction efficiency and low in hydrogen production cost and (2) a process for production of high-purity hydrogen using said system (1).

According to the present invention there can also be provided a fuel cell system using the above system (1) for production of high-purity hydrogen.

What is claimed is:

1. A process for producing high-purity hydrogen by reforming a hydrocarbon and/or oxygen atom-containing hydrocarbon to form a reformed gas containing hydrogen and passing the reformed gas through a hydrogen-separating membrane to recover selectively hydrogen from the reformed gas, said process comprising the steps of:

heating a reforming chamber provided with a hydrogen-separating membrane;

feeding into the reforming chamber a hydrocarbon and/or an oxygen atom-containing hydrocarbon, steam, and oxygen or air;

causing both steam reforming and partial oxidation to take place in the reforming chamber; and passing the reformed gas of the steam reforming operation through the hydrogen—separating membrane to recover high—purity hydrogen.

2. The process of claim 1, wherein the hydrogen-separating membrane comprises palladium or a palladium-silver alloy.

3. The process for producing high-purity hydrogen by reforming a hydrocarbon and/or an oxygen atom-containing hydrocarbon to form a reformed gas containing hydrogen and passing the reformed gas through a hydrogen-separating membrane to recover selectively hydrogen from the reformed gas, said process comprising the steps of:

heating a reforming chamber provided with a hydrogen-separating membrane;

feeding into the reforming chamber a hydrocarbon and/or an oxygen atom-containing hydrocarbon, steam, and oxygen or air;

causing both steam reforming and partial oxidation to take place in the reforming chamber to produce a reaction gas; and passing the reaction gas through the hydrogen-separating membrane to recover high-purity hydrogen;

wherein the heat possessed by the portion of the reaction gas not permeable into the hydrogen-separating membrane and the heat generated by the partial oxidation are the heat sources for the heating and reforming of the hydrocarbon and/or oxygen atom-containing hydrocarbon, water, and oxygen or air.

4. The process of claim 3 further comprising burning the hydrogen and/or carbon monoxide present in the portion of the reaction gas not permeable into the hydrogen-separating membrane to utilize the resulting heat for the heating and reforming of the hydrocarbon and/or the oxygen atom-containing hydrocarbon, water, and oxygen or air.

5. The process of claim 3, wherein the hydrogen-separating membrane comprises palladium or a palladium-silver alloy.

* * * * *